United States Patent

[11] 3,567,912

| [72] | Inventor | Donald William Neild<br>Gatley, England |
|---|---|---|
| [21] | Appl. No. | 722,140 |
| [22] | Filed | Apr. 16, 1968 |
| [45] | Patented | Mar. 2, 1971 |
| [73] | Assignee | The General Electric Company Limited<br>London, England |
| [32] | Priority | Apr. 20, 1967 |
| [33] | | Great Britain |
| [31] | | 18224/67 |

[54] COUNTING DEVICES INCLUDING AN ESCAPEMENT
5 Claims, 4 Drawing Figs.

[52] U.S. Cl. .................................................. 235/92,
340/38
[51] Int. Cl. .................................................. G06m 3/08,
G08g 1/065
[50] Field of Search ........................................ 235/92, (1,
1.1, 21, 36, 29D); 340/38, 378—9

[56] References Cited
UNITED STATES PATENTS

| 1,973,106 | 9/1934 | Rosenberger | 235/92 |
| 2,451,525 | 10/1948 | Webb | 235/92 |
| 2,543,531 | 2/1951 | Lang | 235/92 |
| 2,613,791 | 10/1952 | Triman | 194/9 |
| 2,744,685 | 5/1956 | Lambert et al. | 235/92 |
| 3,179,918 | 4/1965 | Hoeppel | 340/32 |
| 3,440,600 | 4/1969 | Frech et al. | 340/23 |

*Primary Examiner*—Maynard R. Wilbur
*Assistant Examiner*—Joseph M. Thesz, Jr.
*Attorney*—Kirschstein, Kirschstein & Ottinger

ABSTRACT: A counting device for use in a road toll charging or similar system has a number of escape members each driven by a long-life clockwork-type mechanism differently linked to a counter so that under the control of input means responsive to different signals radiated by roadside sources the counter is operated by a different amount corresponding to the particular input signal received. In particular whole units or fractions of units can be registered when a vehicle carrying the counting device uses a road zone or a parking zone respectively.

COUNTING DEVICES INCLUDING AN ESCAPEMENT

This invention relates to counting devices designated to operate in response to input signals radiated energy and to give an indication determined by the total number o such signals received over a given period of time.

The invention also relates to control systems in which an object traversing a given path carries such a counting device and one or more sources of said radiated energy are located at fixed points adjacent to the path and designed to radiate into the path energy which can be received by the counting device as the object carrying it encounters each fixed point so that the reading of the device at any time is determined by the total number of encounters of the object with the fixed points.

One such system, designed for use in road toll charging in which sources of radiated energy are located at entry and exit points or other sites of a road zone for the use of which a charge is to be levied and vehicles using the road zone are each equipped with a counting device for indicating the number of times the road zone has been used, or a "charging-—" point passed, the charge being payable at a given cost per unit on the number of charge units given by this indication, is described in our copending U.S. Pat. application No. 676,356 filed Oct. 18, 1967 in the United States Patent office.

We have now appreciated that for some purposes it might be desirable for the unit charge to be different in different cases, for example at different points, and whilst multiples of the basic unit charge can be obtained by suitable repetition of the signals operating the counting device, this might not always be convenient and is not applicable in cases when only a fraction of the basic unit charge is required to be registered.

The main object of the present invention is, therefore, the modification, of the counting devices and systems as described in U.S. Pat. application No. 676,356 to enable such variations of the basic unit charge to be effected.

A particular object of the invention in connection with the use of such counting devices in road charging systems is to adapt them to record parking charges within the zones, or possibly elsewhere, when levied at unit rates different from the basic unit charge. Uses for other purposes can, however, also be made as indicated in U.S. Pat. application No. 676,356.

According to the invention, a counting device includes in combination a number of escape members each mounted for movement along a given path, drive means arranged to urge each escape member in one direction along its path, escapement means which normally restrains each escape member but can be operated to release the member for advancement by a limited distance along its path, a counter linked with each escape member through linkage means, and radiation-responsive control means designed to operate the escapement means and to respond in a different manner to input radiation signals of different kinds so as to select a different escape member and/or different escapement means and/or different linkage means, the arrangement being such that the extent to which the counter is advanced by an input signal varies between different predetermined values each corresponding to a said different kind of input signal.

The number of escape members may in some cases be unity, in which case either two or more different escapement means are provided, each adapted when operated to permit the escape member to advance by a different predetermined amount along its path, or two or more different linkage means are provided, each giving a different ratio of advancement of the counter to advancement of the escape member (for example by means of gear wheel trains of different gear ratios), or combinations of both methods might be used.

Alternatively, two or more separate escape members might be used, each provided with a different escapement means and connected through a different linkage means to the counter, although part or all of the linkage means might in some cases be common.

In any such case the radiation-responsive control means includes selecting means designed to actuate different escapement means and/or bring in linkage means of different gear ratios (for example by selective operation of clutches) for achieving the desired result.

The nature of the radiation-responsive control means and selecting means will depend on the nature of the input signal (e.g. acoustic, electromagnetic or particle) but it is preferably designed to respond to radiofrequency electromagnetic waves, the different kinds of input signals then being radio signals of different frequencies. The radiation-responsive control means then comprises electric circuits (which might be separate or have parts in common) responsive to different frequencies and whose outputs are arranged to operate electromechanical selecting means, for example by means of piezoelectric crystals, solenoids, or bimetal elements but preferably by means of moving coil-magnet or moving-iron arrangements similar to those described in pending U.S. Pat. application No. 676,356.

Preferably also as described in the said pending patent application, the drive means (which might in some cases be common to two or more escape members) consists of a spiral spring motor, the or each escape means consists of a toothed wheel which in some cases might have only two teeth, or even only a single tooth, and the or each escapement member is of pin-lever form, such as a rocking pin lever. Other forms of drive means, for example electric batteries, fuel cells, thermoelectric generators or radioactive isotope generators, and other forms of escape members, for example endless chains, and escapement means, for example reciprocating pins, might be used in some cases.

When two separate escape members coupled to the counter through gear trains of different ratios are used, the coupling can conveniently be effected through a differential gear connection operable by each gear train, as will be further described later.

Where the input signals consist of radio waves (which might be of pulse form) these might in some cases be modulated so as to carry code signals which may convey information (for example as to the position of the source) or be used in combination with a particular form of radiation-responsive means carried by a vehicle or the like so as to trigger-off an identification system whereby the vehicle or the like registers its presence (possibly by retransmission to a central point), or actuate other mechanisms within the vehicle or the like as might be desired.

Suitable radio signals may be radiated from loops buried in the ground (e.g. a roadway) or from sites at or above ground level (e.g. transmitted from directional units in parking meter bays or at road sides.)

The invention will be further described with reference to the use of a preferred form of counting device in accordance with it in a vehicle road and parking toll system, which system substantially corresponds to that described in copending U.S. Pat. application No. 676,356.

This form of counting device and system are illustrated in the accompanying drawings in which.

Figure 1:
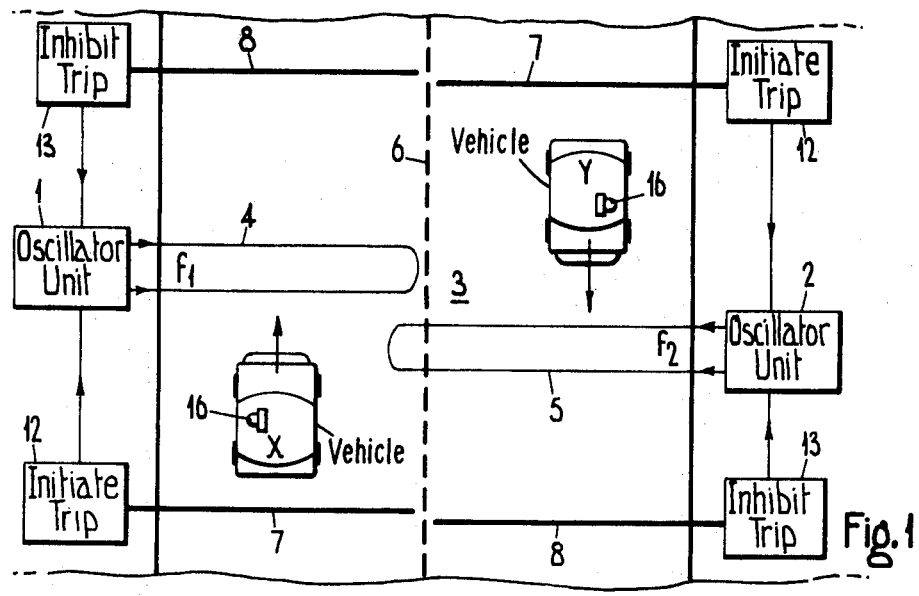
FIG. 1 is a schematic plan of a portion of a roadway representing one of many boundary points of the system.

Referring first to FIG. 1, the system incorporates for each boundary point of a road zone or parking zone a pair of radio transmitter oscillator units 1, 2 disposed at fixed positions one at the side of each entry and exit point 3 on the boundary of the zone. Each oscillator unit 1, 2 includes a conducting loop 4, 5, preferably let into the road or parking site surface and extending to cover the vehicle lane thereof as defined by the dotted line 6, but which may be mounted at the side thereof. Alternatively, a ferrite-cored transmitter coil or dish aerial could be used.

In use, the loops 4, 5 are arranged to be fed from the transmitters with radio frequency signals $f_1, f_2$ respectively for the road charge use (as in the examples illustrated), and $f_3, f_4$ for the parking charge use (not shown), all of which are of different frequencies.

The units 1, 2 can conveniently be made identical and fitted with means for selecting the different signal frequencies to be radiated (as might be necessary, for example, when traffic is diverted or parking arrangements changed) and with a manual or time-operated switch for governing the periods that the system will operate.

Pneumatic trip devices 7, 8 which can be of conventional design may be installed if required near each leading and trailing sides of each of the loops 4, 5 respectively, arranged, in use, by means of associated initiating and inhibiting integrator circuits 12, 13 to switch the units on and then off upon the passage of a vehicle over the pneumatic trips 7, 8.

Each vehicle X or Y entering or leaving the toll zone is fitted (for example, near its windscreen or a side window) with a counter device 16 (to be described later) adapted, in use, to respond to the different radiated frequency signals $f_1, f_2, f_3, f_4$ as the vehicle successively encounters the loops so as to give a visual indication to the driver of the vehicle, and an outside observer, that the vehicle has either entered or left a road or parking toll zone and that the device is functioning properly, and also to record and display a cumulative indication corresponding to the use of such toll zones for the purpose of charging over a period of time.

Figure 2:
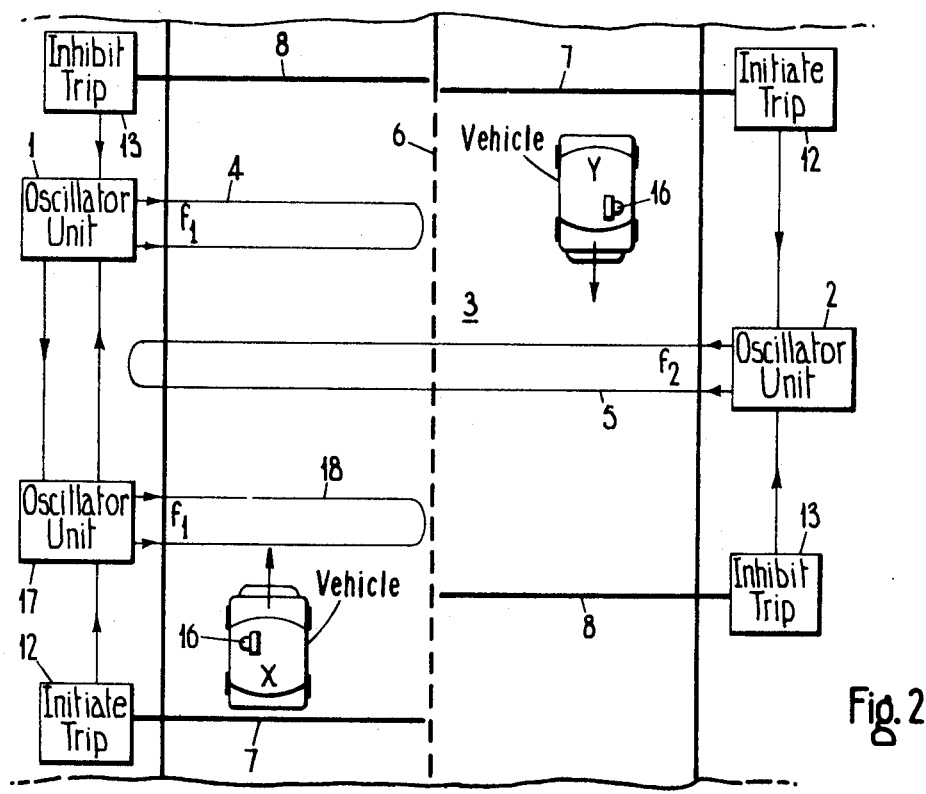
FIG. 2 is a view similar to that of FIG. 1 of a modified system.

FIG. 2 illustrates how such a system may be extended to multiple basic unit charging (in this case to double unit charging) which might be required for some zones. For this purpose, a further transmitter oscillator unit 17 and a further transmitter oscillator unit 17 and a further associated conducting loop 18 is installed at the entry point of the road or parking zone, arranged to transmit a corresponding signal $f_1$ (as shown for road charge use) or $f_3$ (not shown) respectively. The conducting loops 5, radiating the signals $f_2$ (as shown for road charge use) or $f_4$ (not shown) extended so as to be positioned between the loops 4 and 18 radiating the signals $f_1, f_3$ respectively. In effect, the arrangement causes the counter device 16 to register a corresponding number of times as the vehicle successively encounters the individual signals of that zone.

Figure 3:
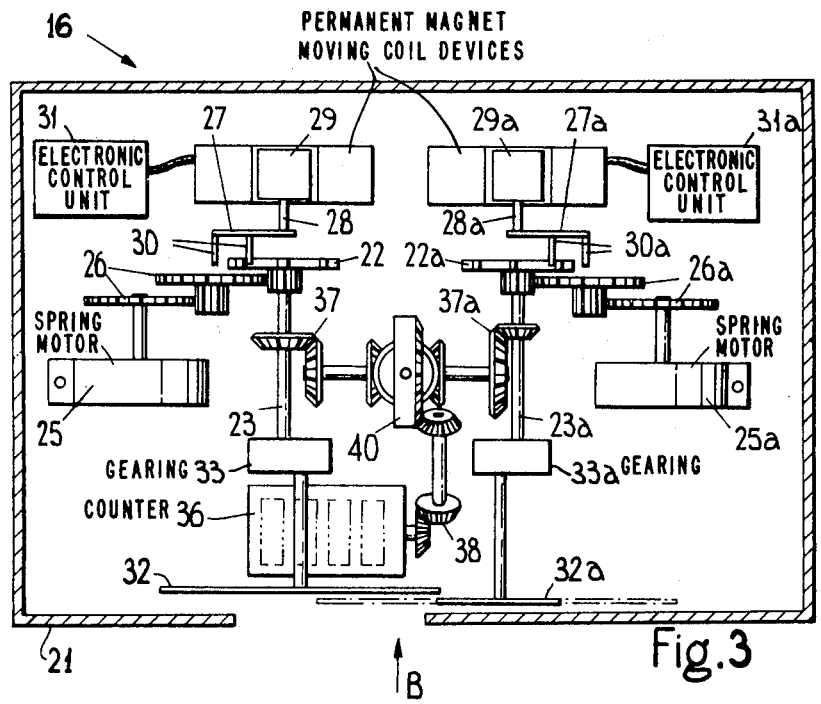
FIG. 3 is a diagrammatic representation of the counting device.
Figure 4:
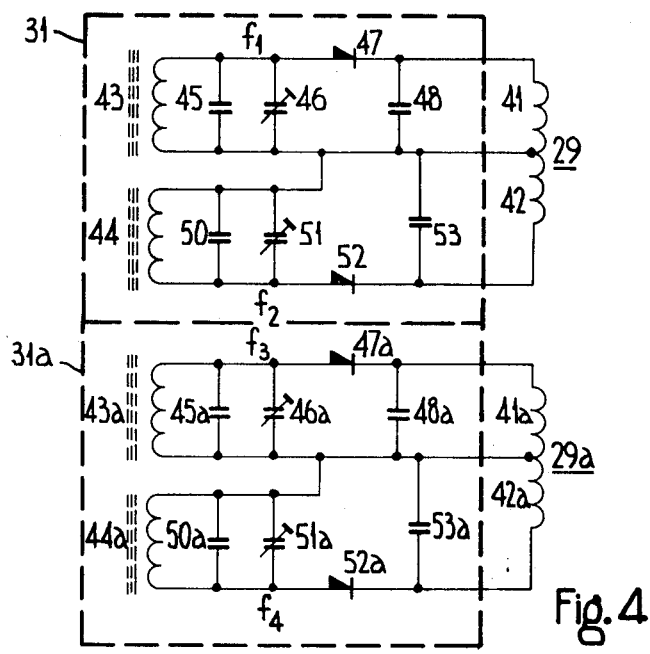
FIG. 4 is a circuit diagram of an electronic control unit including the radiation-responsive means of the counting device.

These and other features of the systems described above will be better understood in the description to the counting device shown in FIGS. 3 and 4 which in itself is a modified form of the device described and illustrated in our copending U.S. Pat. application No. 676,356 and parts corresponding thereto are similarly referenced.

Referring to FIGS. 3 and 4, the counting device comprises a casing 21 provided with means (not shown) for detachably mounting it on the windscreen or other window of the vehicle. Mounted within the casing 21 are two clockwork mechanisms including escape wheels 22, 22a fixed to shafts 23, 23a which are journaled in brackets (not shown), clockwork spring motors 25, 25a connected through gearing 26, 26a to the wheels 22, 22a for urging them to rotate in anticlockwise and clockwise directions respectively (as viewed in the direction of arrow B, and rocking pin-lever escapements 27, 27a fixed to spindles 28, 28a of permanent magnet-type moving coil devices 29, 29a. Pins 30, 30a of the levers 27, 27a serve in well-known manner to restrain the escape wheels against free rotation but permit intermittent rotation (i.e. one tooth at a time) when the levers 27, 27a are actuated.

Also mounted within the casing are two electronic control units 31, 31a which in response to one or other of the two different frequency signals $f_1, f_2$ and $f_3, f_4$ respectively are designed to supply an electric current to a respective one of the moving coil devices 29, 29a arranged to rotate its coil in one direction or the other for actuating the pin-levers 27, 27a and thus allow the escape wheels 22, 22a to move on through an angle equal to one tooth pitch. If for any reason signals of the same frequency are received consecutively by the devices, then the second and subsequent signal will have no effect since each pin-lever 27, 27a is prevented from rotating further in the same direction by the engagement of the pins 30, 30a with the wheels 22, 22a.

A road toll indicator disc 32 and a parking toll indicator flag 32a are rotatably mounted in the said bracket and connected to the escape wheel shafts 23, 23a respectively through gearing 33, 33a designed to give a 90° rotation of the disc 32 and flag 32a for each tooth pitch movement of their escape wheels 22, 22a. The indicator disc 32 is divided into alternately colored for example, red and yellow quadrants and the indicator 32a comprises two diametrically opposed "Parking" flags. Two windows (not shown) are provided at opposite sides of the casing for enabling the driver and an outside observer to recognize the particular colored quadrant displayed and the presence or absence of a "Parking" flag 32a.

A decade counter 36 is mounted within the casing for providing a visual cumulative indication determined by the aggregate of the step-by-step movements of the escape wheels 22, 22a (and of the indicators 32, 32a), and is also driven by the escape wheel shafts 23, 23a through bevel gearing 37, 37a, 38 and through differential gearing 40, the gearing 37a having a reduction of 3:1 with respect to the gearing 37. Only four digit wheels (shown in dotted lines) are provided in the counter 36 but more or less than these can of course be provided to suit the particular requirements. The numbers displayed by the counter are viewed through a window (not shown) in the casing and all displays may be viewed easier in darkened conditions by providing illuminating means.

Referring particularly to FIG. 4, each winding of the moving coils 29, 29a is preferably formed as two half windings 41, 42 and 41a, 42a respectively. Then the control units 31, 31a incorporate two ferrite-cored receiver coils 43, 44 and 43a, 44a forming inductances of a pair of tuned circuits, so arranged that an alternating current signal is induced in the receiver coils on the passage of the vehicle over a conducting loop. The receiver coils 43, 43a are coupled to capacitors 45, 45a and trimmers 46, 46a which are tuned to resonate at the frequencies $f_1, f_3$ so that in use, the alternating current signal produced when the vehicle passes over the appropriate conducting loop is rectified by diodes 47, 47a to charge capacitors 48, 48a from which direct current is fed from the units 31, 31a to the half windings 41, 41a causing the moving coils to rotate in one direction. Similarly, the receiver coils 44, 44a, capacitors 50, 50a and trimmers and trimmers 51, 51a are tuned to resonate at the frequencies $f_2, f_4$ when the vehicle passes over the appropriate conducting loop, the developed signal being rectified by diodes 52, 52a to charge capacitors 53, 53a from which direct current is fed to the half windings 42, 42a causing the moving coils to rotate in the other direction.

This bidirectional rotation of each moving coil provides the required rocking motion of the pin-levers 27, 27a through the spindles 28, 28a from one extreme position to the other for permitting the intermittent escape of the wheels 22, 22a.

Since the radiated frequency oscillations $f_1, f_2$ will $f_3, f_4$ will in fact couple the receiver coils 43, 44, 43a, 44a, it is arranged that the Q factor of each tuned circuit is sufficient to discriminate against frequencies other than that to which the circuit is tuned, so that no significant output will be obtained from the other circuits.

In operation of the arrangement shown in FIG. 1, each road vehicle, fitted with a counting device 16, will, upon entry to a road or parking toll zone boundary point 3, first initiate the operation of the transmitter oscillator unit 1 and then pass through the radiated electromagnetic field of frequency oscillations $f_1$ or $f_3$ causing the moving coil 29 or 29a to rotate in one direction with the resultant movement of the indicator disc 32 or flag 32a through an angle of 90° so as to display the yellow quadrant or "Parking" flag 32a which indicates to the driver of the vehicle (and an outside observer) that he has entered a chargeable zone and that his counting device is in operation.

Simultaneously, the decade counter 36 will register half a unit (for road use) or one sixth unit (for parking use) by virtue of the design ratio of the gearing employed, followed by the inhibition of the transmitter oscillator 1.

Upon leaving the road or parking zone, the same sequence of operations occur with the exception that the vehicle will pass through the field of the oscillations $f_2$ or $f_4$ causing the moving coil 29 or 29a to rotate in the other direction and the indicator disc 32 or flag 32a to move through a further angle of 90° so as to display the red quadrant or remove the parking flag from view indicating that the vehicle has passed out of the road or parking zone. Again, simultaneously, the decade counter will register a further half unit (for road use) or one sixth unit (for parking use) thus completing a whole unit or one third unit respectively for the journey into and out of the road or parking zone. Of course, both uses may be encountered simultaneously during such a journey and this will be indicated by the display of a "Parking" flag in front of a yellow quadrant (as shown in chain lines in FIG. 3).

The operation of the arrangement for multiple charging shown in FIG. 2 is similar to that already described above, the only difference being that the cycle of operations is repeated and therefore further whole or fractional units will be registered on the decade counter for the same excursion of a vehicle into a road or parking toll zone.

It will be seen from the foregoing description that a counting device constructed substantially as described provides a completely self-contained and compact clockwork powered integrator unit, which, except for periodic winding of the clockwork motor (if required, or at long intervals), can be sealed against unauthorized access, the motor being wound automatically or by an authority making the toll charge. Since the different vehicles using a system described above can be fitted with identical counting devices, the latter can be mass produced at relatively low cost.

It will be understood that the references herein to "road zones," "parking zones" or "other sites" is intended to include also all such zones or sites which are essentially charging points, where for example, it is required that a charge be levied for the use or passage of a vehicle at the point, in which case, of course, the sources of radiated energy for effecting the appropriate charge indication (as described in the foregoing example of the invention) will be in close proximity to each other at the point. The counter could, of course, alternatively or additionally be arranged to register a charge indication in response to a single radiated energy signal at a point, to denote passage by or use of the point, if desired.

I claim:

1. A counting device including in combination a counter linked with each of a plurality of different counting mechanisms each of which mechanisms includes an escape member urged to move in a given direction by a spring but held by an escapement which can be operated by an electromechanical means to release the escape member for a step of movement in said direction, linkage means connecting the counter with the escape member so that the counter will be operated to give an indication of the number of said steps of movement of the escape member, and electrical circuit input means responsive to a pair of electromagnetic input signals of different predetermined frequencies and whose output is arranged to actuate the electromechanical means in one manner for one of the said pair of frequencies but in a different manner for one of the said pair of frequencies but in a different manner for the other of the said pair of frequencies such that following an operation of the escapement to produce a step of movement of the escape member in response to the receipt of an input signal of the one frequency, a further operation of the escapement to produce a further step of movement of the escape member in response to the receipt of a further input signal of that frequency can only take place after the receipt of an intervening input signal of the other frequency, the said pairs of input frequencies being different for the different counting mechanisms and each counting mechanism having a different gear ratio for its linkage means connecting its escape member to the counter so that the extent to which the counter is advanced in response to a step of movement of the escape member is different for the different escape members.

2. A counting device according to claim 1, wherein the different gear ratio linkage means are each arranged to register a half of a different basic unit on the counter by an operation of the respective escapement in one manner when the input means responds to one of said frequencies of a pair of different input signal frequencies and completion of the full different basic unit registration is effected by operation of the escapement in the other manner when the input means is next responsive to the other frequency of said pair of different signal frequencies.

3. A counting device according to claim 2, wherein the different linkage means include a common differential gear coupling to the counter.

4. A counting device according to claim 3, wherein each escapement consists of a rocking pin lever pivoted at its center and arranged to be rocked in opposite senses on receipt of the input signals of the different pair of frequencies, wherein each escape member consists of a toothed wheel driven by a spiral spring, each such rocking movement of each rocking pin lever releasing a pin at one end of the lever from a tooth of an associated escape wheel and permitting it to rotate under the urging of the spiral spring until the other pin engages another tooth of the escape wheel, said engagement being maintained until the receipt of an input signal of the second frequency of the said pair of frequencies rocks the lever in the other sense, wherein each electromechanical escapement-operating means incorporates a permanent magnet-type moving coil device and the electrical circuit input means is arranged to feed a direct electric current through the coil in different directions in response to the receipt of the appropriate pair of input signals of different frequencies, each electrical circuit input means including rectifier circuits designed to generate the direct electric current from the input signals so that the operation of the escapement is effected solely by the energy of the associated pair of input signals.

5. A control system in which a vehicle traversing a given path carries a counting device and in which a number of sources of electromagnetic signals located at fixed positions adjacent to the path are each designed to radiate into the path a pair of electromagnetic signals of different frequencies which can be received by the counting device as the vehicle carrying it passes by each fixed position so that the device can provide an indication of the total number of passages of the vehicle by the fixed position, wherein the counting device is in accordance with claim 1, each source of electromagnetic signals is arranged to radiate its signals of two different frequencies at spaced points such that the vehicle is arranged to encounter the two signal frequencies in alternate succession, and zones of the vehicle path for the use of which a different charge rate is to be levied being provided with signal sources the two frequencies of which are different from those of the sources at other zones.